US012024336B2

(12) United States Patent
Lee et al.

(10) Patent No.: US 12,024,336 B2
(45) Date of Patent: Jul. 2, 2024

(54) HARDENED REUSABLE SHIPPER WITH REVERSIBLE LABEL HOLDER

(71) Applicant: Cryoport, Inc., Brentwood, TN (US)

(72) Inventors: Ben Lee, Corona, CA (US); Bret Bollinger, Yorba Linda, CA (US); Bobby Onel, Laguna Beach, CA (US); Mike Dybicz, Nashville, TN (US); James Wilbourn, Costa Mesa, CA (US)

(73) Assignee: Cryoport, Inc., Brentwood, TN (US)

( * ) Notice: Subject to any disclaimer, the term of this patent is extended or adjusted under 35 U.S.C. 154(b) by 0 days.

(21) Appl. No.: 17/868,088

(22) Filed: Jul. 19, 2022

(65) Prior Publication Data

US 2024/0025598 A1 Jan. 25, 2024

(51) Int. Cl.
*B65D 25/20* (2006.01)
*B65D 81/18* (2006.01)

(52) U.S. Cl.
CPC .......... *B65D 25/205* (2013.01); *B65D 81/18* (2013.01); *B65D 2203/02* (2013.01)

(58) Field of Classification Search
CPC ...... B65D 25/205; B65D 81/18; B65D 88/05; B65D 88/14; B65D 90/008; B65D 90/029; B65D 90/325
See application file for complete search history.

(56) References Cited

U.S. PATENT DOCUMENTS

| 3,057,506 A | * | 10/1962 | Wetlesen | .................. B65F 1/08 220/493 |
| 4,307,581 A | | 12/1981 | Reid | |
| 4,474,033 A | | 10/1984 | Baker | |
| 5,312,182 A | * | 5/1994 | Mlakar | ............... B65D 88/005 312/409 |

(Continued)

FOREIGN PATENT DOCUMENTS

| CN | 204236906 U | 4/2015 |
| CN | 110844347 A | 2/2020 |

(Continued)

OTHER PUBLICATIONS

PCT; International Search Report and Written Opinion dated Dec. 21, 2021 in PCT Application No. PCT/US2021/050470.

(Continued)

*Primary Examiner* — Bryon P Gehman
(74) *Attorney, Agent, or Firm* — Snell & Wilmer L.L.P.

(57) ABSTRACT

Hardened reusable shipping containers with a reversible label holder and methods of using the same are disclosed herein. A hardened reusable shipping container may have a base enclosure having a payload area that is configured to receive a payload and maintain a temperature of an environment surrounding the payload. The base enclosure may further have an exterior surrounding the payload area. The exterior may include multiple walls. One of the multiple walls may define a recess. The hardened reusable shipping container may have a plate having a first surface and a (Continued)

second surface opposing the first surface. The plate may be configured to be removably inserted into the recess and display one or more visuals on at least one of the first surface and the second surface.

16 Claims, 6 Drawing Sheets

(56) References Cited

U.S. PATENT DOCUMENTS

| | | | | |
|---|---|---|---|---|
| 5,388,691 | A * | 2/1995 | White | H01H 9/0242 220/242 |
| 5,413,410 | A * | 5/1995 | Mlakar | B65D 88/14 312/409 |
| 5,599,082 | A * | 2/1997 | Mlakar | B65D 88/14 312/293.3 |
| 5,816,433 | A | 10/1998 | Higgins | |
| 8,800,797 | B2 * | 8/2014 | Fingerhut | B65D 88/14 220/88.1 |
| 2013/0062356 | A1 | 3/2013 | Deka | |
| 2015/0060440 | A1 * | 3/2015 | Lippold | B65D 81/38 220/1.5 |
| 2016/0244209 | A1 | 8/2016 | Hain | |
| 2019/0234671 | A1 | 8/2019 | Stanford | |
| 2020/0115140 | A1 | 4/2020 | Kuhn et al. | |
| 2022/0082317 | A1 | 3/2022 | Bollinger et al. | |

FOREIGN PATENT DOCUMENTS

| | | |
|---|---|---|
| CN | 216944140 U | 7/2022 |
| DE | 202006011143 U1 | 10/2007 |
| JP | 06127573 A | 5/1994 |
| JP | 2003246329 A | 9/2003 |
| JP | 2004-042995 A | 2/2004 |
| JP | 3220792 U | 4/2019 |
| KR | 20040080384 A | 9/2004 |
| KR | 20-0443141 Y1 | 1/2009 |
| KR | 101877721 B1 | 7/2018 |
| KR | 20210070785 A | 6/2021 |
| WO | 2014197511 A2 | 12/2014 |
| WO | 2018-005859 A2 | 1/2018 |
| WO | 2019079186 A1 | 4/2019 |
| WO | 2020-157488 A1 | 8/2020 |

OTHER PUBLICATIONS

PCT; International Preliminary Report on Patentability (IPRP) issued by KIPO dated Mar. 30, 2023 in PCT Application Serial No. PCT/US2021/050470.
USPTO; Restriction Requirement dated Apr. 6, 2023 from U.S. Appl. No. 17/476,036.
Machine English Language translation of KR20040080384 to Leba et al. Whole document. Translated Jun. 2023. (Year: 2004).
Machine English Language translation of DE202006011143 to Dreiss et al. Whole document. Translated Jun. 2023. (Year: 2007).
USPTO; Office Action dated Jun. 21, 2023 from U.S. Appl. No. 17/476,036.
PCT; Notification of Transmittal of International Search Report and the Written Opinion of the International Searching Authority dated Nov. 9, 2023 for Application No. PCT/US2023/027652.
USPTO; Final Office Action dated Dec. 27, 2023 in U.S. Appl. No. 17/476,036.

* cited by examiner

HARDENED REUSABLE SHIPPER WITH REVERSIBLE LABEL HOLDER

BACKGROUND

1. Field

The various aspects and embodiments described herein relate to shipping containers, particularly hardened reusable shipping containers that have reversible labels and methods of using the same.

2. Description of the Related Art

In the health, medical, pharmaceutical, and/or life science industries, safe storage and fast transportation of payload in a temperature-controlled and watertight environment is important. Hardened reusable shipping containers that maintain, regulate, or control the payload area temperature are desirable in transporting temperature sensitive payload in such industries. The payload area temperature may be maintained by using phase change materials (e.g., dry ice) and/or cryogenic liquids (e.g., liquid nitrogen). Due to the temperature sensitive nature of the shipments, issues with shipping that lead to delivery delay may result in the payload being expired, spoiled, reduced quality, or damaged. Hence, displaying shipping labels, including a distinct shipping label for each leg of transportation, shipping instructions, such as information about care and handling, and payload specific information, such as whether the payload is hazardous, sensitive to certain conditions, etc. in a clear, concise, and an organized manner is imperative. As such, there is a need for a hardened reusable shipping container with improvements to relay different shipping addresses, instructions, and payload specific information to a handler of the hardened reusable shipping container to mitigate or eliminate delivery delays and prevent damage to the payload.

SUMMARY

Hardened reusable shipping containers and methods of using the same are disclosed herein. A hardened reusable shipping container may have a base enclosure having a payload area that can receive and store a payload. The temperature of the environment surrounding the payload may be maintained, regulated, and/or controlled via various systems including cryogenic liquids and/or phase change materials. The base enclosure may have an exterior surrounding the payload area. The exterior may include multiple walls. The hardened reusable shipping container may have a plate removably attachable to the base enclosure. Specifically, the plate may be removably attachable to one of the exterior walls. The plate may be double-sided or, in other words, display a visual or visuals on opposing surfaces. The visual may include information related to the payload or shipping. Each of the opposing surfaces may display a different visual than the other, such as shipping information of a first leg of shipping and a second leg of shipping.

In one aspect, the disclosure is embodied in a hardened reusable shipping container. The hardened reusable shipping container has a base enclosure. The base enclosure has an exterior including a plurality of walls. The base enclosure has a payload area. The plurality of walls surround the payload area. The payload area is configured to receive a payload and maintain a temperature of an environment surrounding the payload. One of the multiple walls defines a recess. The hardened reusable shipping container further has a plate. The plate has a first surface and a second surface opposing the first surface. The plate is removably inserted into the recess and displays one or more visuals on at least one of the first surface and the second surface.

These and other embodiments may optionally include one or more of the following features. The hardened reusable shipping container may further include a handle. The handle may be received into a notch defined in the lid when in a down position. The handle may be selectably extendable from the notch to an up position. Thus, the handle is configured to be traversed between the up position and the down position and held to transport the hardened reusable shipping container in the up position. The plate may be further configured to be slidably removed from the recess when the handle is in the up position and not removable when the handle is in the down position. The hardened reusable shipping container may further include a lid. The lid may be configured to be coupled to the base enclosure and opened and closed. The lid may define a notch. The notch may have a shape corresponding to a shape of the handle. The notch may be configured to receive the handle when the handle is in the down position. The recess may include opposing tracks. The tracks may be engaged with the plate and may retain the plate at least partially in the recess. Thus, the plate may be configured to be engaged with the tracks to be retained by the tracks. The wall may further define an opening into the recess. The opening may be configured to provide a path for the plate to be slidably inserted into the recess. The hardened reusable shipping container may further include a cover. The cover may be fastened to the hardened reusable shipping container and may cover the opening such that the plate is retained in the recess.

In another aspect, the disclosure is embodied in a hardened reusable shipping container. The hardened reusable shipping container has a base enclosure. The base enclosure has a payload area. The payload area is configured to receive a payload and maintain a temperature of an environment surrounding the payload. The base enclosure further has an exterior surrounding the payload area. The exterior includes multiple walls. One of the multiple walls defines a recess. The hardened reusable shipping container further has a lid. The lid is attached to the base enclosure and can be opened and closed. The hardened reusable shipping container further has a plate. The plate has a first surface and a second surface opposing the first surface. The plate is disposed in the recess and displays information related to the payload or shipping on the first surface and/or the second surface.

These and other embodiments may optionally include one or more of the following features. The lid may have a blocking edge that mechanically blocks the plate from being removed from the recess when the lid is closed and that does not mechanically block the plate from being removed from the recess when the lid is open. This way, the plate may be retained in the recess when the lid is closed. The plate may be removable from the recess when the lid is opened. The hardened reusable shipping container may further include a handle. The handle may be configured to be traversed between an up position and a down position and held to transport the hardened reusable shipping container in the up position. The plate may be further configured to be slidably removed when the handle is in the up position and not removable when the handle is in the down position. The lid may define a notch. The notch may have a shape corresponding to a shape of the handle. The notch may be configured to receive the handle when the handle is in the down position. The recess may include opposing tracks. The opposing tracks slidably engage with the plate and retain the plate at least partially in the recess. The wall may further define an opening into the recess. The opening may be configured to provide a path for the plate to be slidably inserted into the recess. The hardened reusable shipping container may further include a cover. The cover may be configured to cover the opening such that the plate is retained in the recess.

In yet another aspect, the disclosure is embodied in a method for using a hardened reusable shipping container. The method includes providing a base enclosure having a payload area that is configured to receive a payload an maintain a temperature of an environment surrounding the payload. The base enclosure further has an exterior surrounding the payload area. The exterior includes multiple walls. One of the multiple walls defines a recess. The method further includes providing a plate having a first surface and a second surface opposing the first surface. The plate is configured to display shipping information related to a first destination on the first surface and shipping information related to a second destination on the second surface. The method further includes inserting the plate into the recess such that the first surface is facing away from the wall during transporting of the hardened reusable shipping container to the first destination based on the shipping information related to the first destination. The method further includes inserting the plate into the recess such that the second surface is facing away from the wall during transporting of the hardened reusable shipping container to the second destination based on the shipping information related to the second destination.

These and other embodiments may optionally include one or more of the following features. The method may further include traversing a handle of the reusable shipping container to an up position from a down position to slide the plate into or out of the recess and traversing the handle to the down position from the up position to retain the plate in the recess. The method may further include aligning and engaging opposing sides of the plate with opposing tracks disposed within the recess and sliding the plate through the tracks to allow the tracks to retain the plate. The method may further include removing a cover covering an opening into the recess to slide the plate into or out of the recess and covering the opening with the cover to retain the plate in the recess.

BRIEF DESCRIPTION OF THE DRAWINGS

Other apparatus, methods, features, and advantages of the present disclosure will be apparent to one skilled in the art upon examination of the following figures and detailed description. Component parts shown in the drawings are not necessarily to scale and may be exaggerated to better illustrate the important features of the present disclosure.

DETAILED DESCRIPTION

Disclosed herein are hardened reusable shipping containers (or "shippers") and method for using the same. The shippers may maintain, regulate, or control a temperature or a temperature range within a payload area. Systems including cryogenic liquids and/or phase change materials may be used in conjunction with the shippers to set or maintain the temperature inside the payload area at a desired temperature or temperature range. The desired temperature or temperature range may be a temperature or temperature range that preserves a payload within the payload area before, during, and/or after shipment. The shippers may be made from a hardened material (e.g., polycarbonate, polyethylene, etc.) that protects the payload from environmental factors including shock and vibration. Further, the shippers may be decontaminated and cleaned, thereby allowing reuse of the shippers.

Some of the shippers may maintain, regulate, or control the temperature or the temperature range within the payload area for a limited time. As such, swift delivery of the payload is important to prevent the temperature within the payload area from changing to an undesirable temperature or temperature range that may damage the payload. Errors such as mishandling or misdelivering the shippers may cause or contribute to delays in shipment, thus jeopardizing the payload. Shippers having a reversible plate or label holder that have shipping and handling instructions for one leg of shipment on one side and another leg of shipment on another side may mitigate or prevent errors during the course of shipment. Hence, the shipper may be shipped and handled as prescribed for each leg of the shipment and deliver the shipper without damaging the payload.

Figure 1:
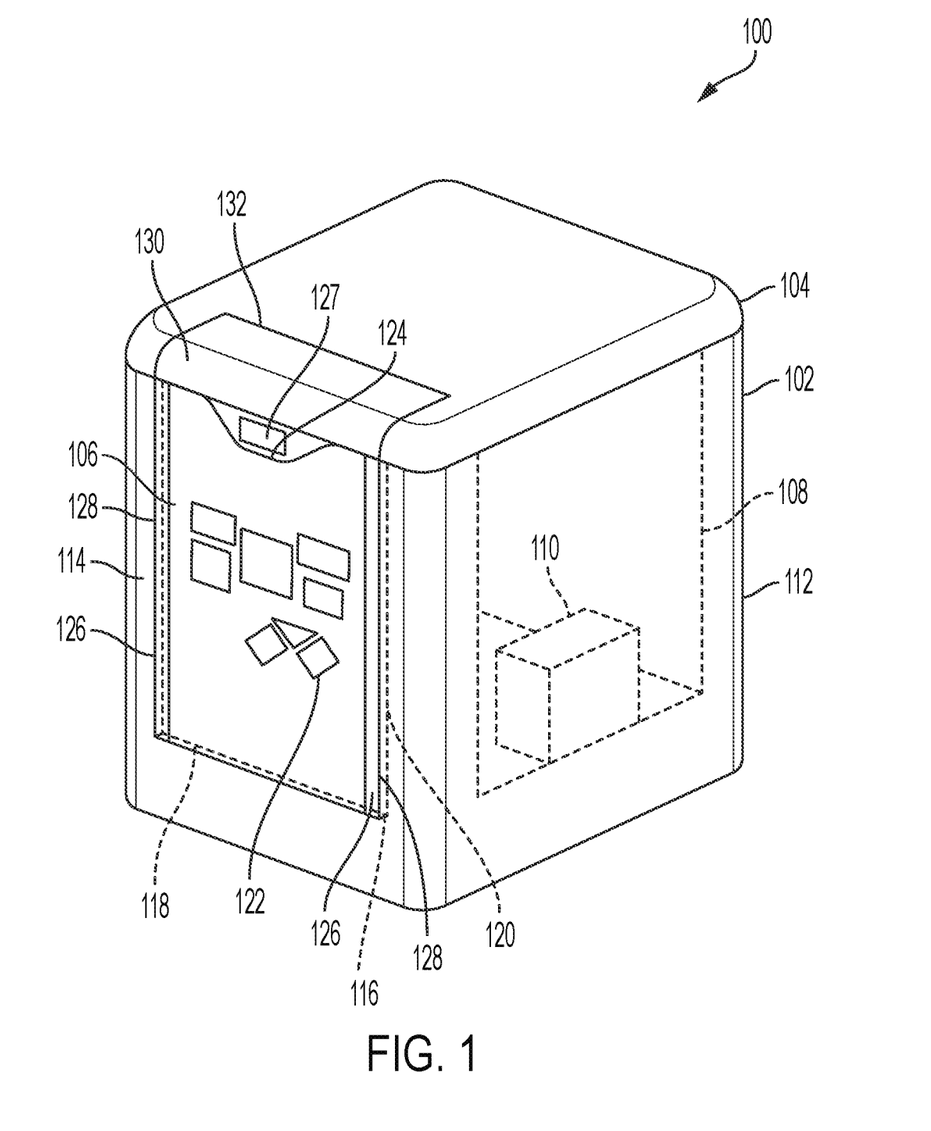
FIG. 1 shows a perspective view of a hardened reusable shipping container according to an aspect of the present disclosure.

FIG. 1 shows a perspective view of a hardened reusable shipping container 100 or a shipper 100. The shipper 100 may have a base enclosure 102, a lid 104, and a plate 106. The base enclosure 102 may have a payload area 108. The payload area 108 may be configured to receive a payload 110. For example, the payload area 108 may be defined within the shipper 100 so as to be surrounded on all sides by the hardened reusable shipping container 100 and thermally insulated thereby. The payload area 108 may be configured to maintain a temperature of an environment surrounding the payload 110. The base enclosure 102 may further have an exterior 112 surrounding the payload area 108. The exterior 112 may include a plurality of walls 114. One of the plurality of walls 114 may define a recess 116. In FIG. 1, the recess 116 is defined by a rear wall of the plurality of walls 114 by example. In other examples, the recess 116 may be defined by any other wall of the plurality of walls 114.

The lid 104 may be coupled to the base enclosure 102 and opened and closed to control access to the payload area 108. The lid 104 may be coupled to the base enclosure 102 with one or more hinges by example. In other examples, such as the example shown in FIG. 4, the lid 104 may sit on the base enclosure 102 over the payload area. Clips, buckles, ties, hooks, male-female connectors, and/or the like may secure the lid 104 onto the base enclosure 102.

With renewed attention on FIG. 1, the base enclosure 102 and the lid 104 may be made from the same material or materials. The material or materials may be a hardened material including but not limited to polycarbonate and polyethylene. The lid 104 may be shaped and sized such that the lid 104 is at least partially within the confinements of the base enclosure 102 in a closed position.

The plate 106 may have a first surface 118 and a second surface 120 opposing the first surface 118. The first surface 118 and/or the second surface 120 may display one or more visuals 122. The visuals 122 on the first surface 118 may be different from the visuals 122 on the second surface 120. For example, the visuals 122 on the first surface 118 may include shipping information related to a first destination and the visuals 122 on the second surface 120 may include shipping information related to a second destination. In addition or in lieu, the visuals 122 may include handling and care instructions. For example, the visuals 122 may include a "no x-ray" warning, a temperature sensitive payload warning, a personal protective equipment caution label, an exemption label, a class number (e.g., class 9), or a hazardous material warning (e.g., a UN label). The visuals 122 may include graphic, text, numbers, and/or barcode. The visuals 122 may be labels, inscriptions, stickers, writings, etchings, etc. In some embodiments, the first surface 118 and/or the second surface 120 may have etchings, writings, or other indicators to indicate a location for each visual 122. The visuals 122 may be attached to the first surface 118 and/or the second surface 120 at their designated locations using adhesives and/or other conventional fasteners. The visuals 122 may be temporarily attached to the plate 106 so that the plate 106 may be reused in more than one shipment.

The plate 106 may be made from metal, plastic, wood, or glass. The plate 106 may have a generally square, rectangular, circular, or any other shape. The plate 106 may have one or more notches 124. The one or more notches 124 may create space for other visuals to be displayed on the shipper 100 rather than the plate 106, such as shipper visuals 127. Shipper visuals 127 may include a barcode as shown in FIG. 1, or other visuals. The plate 106 may be shaped and sized to fit within the recess 116. The fitment may be a tight fitment to mitigate or prevent lateral and back and forth movement and/or rattling of the plate 106 within the recess 116.

The recess 116 may include opposing tracks 126. The tracks 126 may be a unitary part of the base enclosure 102 or a separate part that is coupled to base enclosure 102 via conventional fastening means such as snap fitment, screws, conventional fasteners, male-female connectors, adhesives, welds, or the like. The tracks 126 may be made from metal, plastic, wood, or glass. The tracks 126 may be located on opposing sides 128 of the recess 116. The tracks 126 may extend fully or partially along a length of the sides 128. In some embodiments, the tracks 126 may be interrupted to create multiple shorter tracks along the length of each side 128.

The plate 106 may slidably engage the tracks 126 to be inserted into and removed from the recess 116. The tracks 126 may retain the plate 106 within the recess 116. The tracks 126 may mitigate or prevent back and forth movement of the plate 106 within the recess 116. The plate 106 may be biased against the tracks 126. The plate 106 being biased against the tracks 126 may allow for the plate 106 to be secured tightly and minimize movement, and thereby rattling, of the plate 106 within the recess 116. Thus, the tracks 126 may be engaged with the plate 106 and may retain the plate 106 at least partially in the recess 116.

In some embodiments, the tracks 126 may be directly coupled onto one of the walls 114 instead of inside the recess 116. In such embodiments, the tracks 126 and/or the wall 114 may have an extension or a protrusion that may stop the sliding of the plate 106 from below to retain the plate 106. In some embodiments, the tracks 126 may be made from a flexible material such that the tracks 126 may be pried open to insert the plate 106 under the tracks 126 and return to their original form once the plate 106 is inserted to retain the plate 106. In some embodiments, the plate 106 may be coupled to the wall 114 conventional fastening means such as snap fitment, screws, conventional fasteners, male-female connectors, adhesives, welds, or the like.

The shipper 100 may further include a handle 130. The handle 130 may be traversed between an up position (see FIG. 2) and a down position as shown in FIG. 1. The handle 130 may be held to transport the shipper 100 in the up position. In the down position, the handle 130 may sit over at least a portion of the plate 106 that is within the recess 116 and/or the tracks 126 to prevent the plate from sliding out of the recess 116 and/or the tracks 126. As such, the plate 106 may be slidably removed from the recess 116 and/or the tracks 126 when the handle 130 is in the up position (see FIG. 2) and may not be removed when the handle 130 is in the down position as shown in FIG. 1. The handle 130 may be received by a notch 132 of the lid 104 when the handle 130 is in the down position. The notch 132 may be shaped so that it has a shape corresponding to a shape of the handle. Similarly, the handle 130 may be shaped and sized to fit snugly in the notch 132. The handle 130 may be flush with the lid 104 when the handle 130 is in the down position. Hence, the handle 130 may be integrated with the lid 104 and appear unified with the lid 104. Stated differently, the handle may be received into a notch defined in the lid and selectably extendable from the notch to an up position. In some embodiments, in the down position, the handle 130 may be adjacent to the lid 104 as opposed to being within the notch 132 of the lid 104. In such embodiments, the handle 130 may extend along an entirety of a wall 114 of the base enclosure 102.

Figure 2:
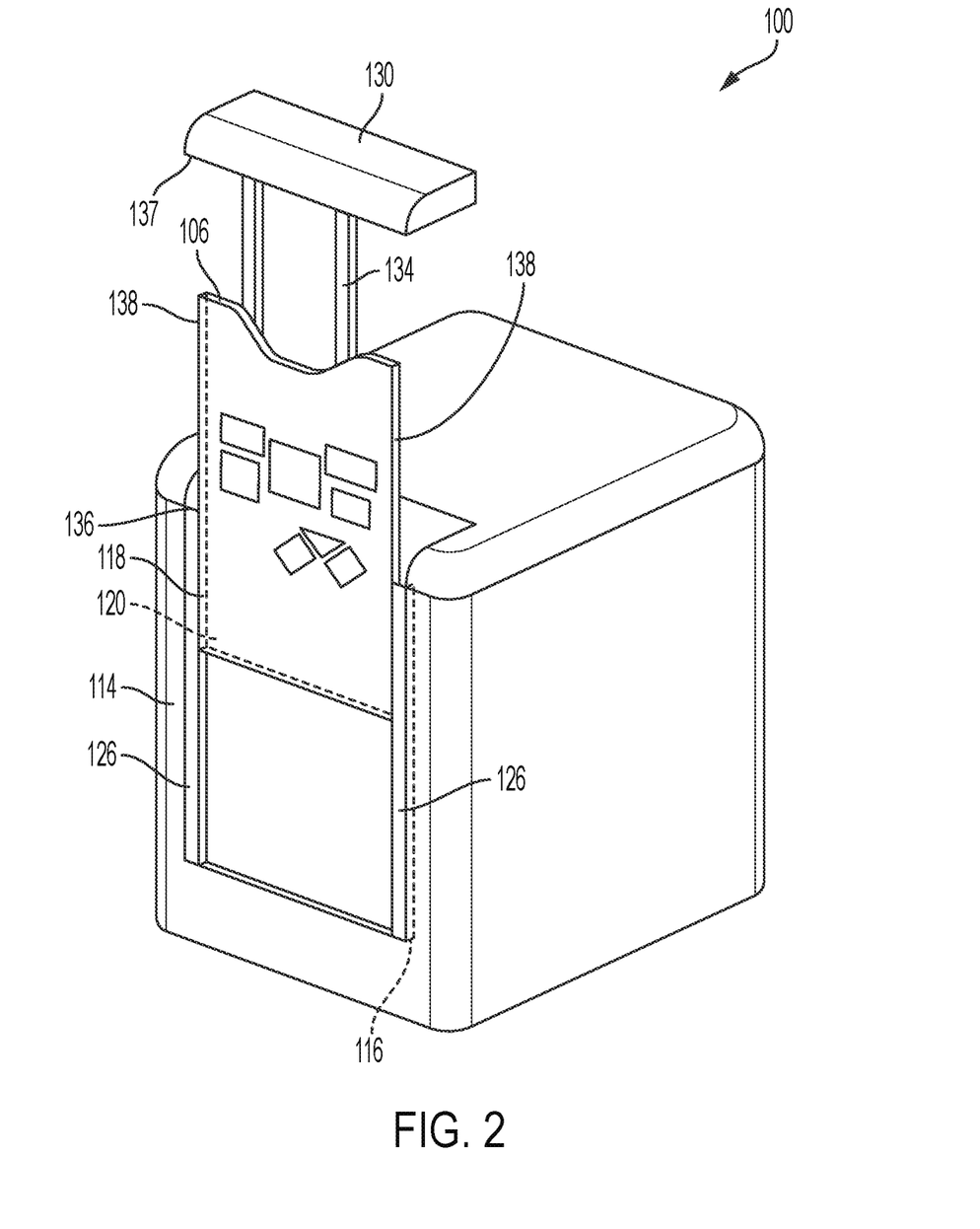
FIG. 2 shows a perspective view of the hardened reusable shipping container of FIG. 1 having a handle in an up position according to an aspect of the present disclosure.

FIG. 2 shows a perspective view of the shipper 100 with the handle 130 in the up position. The handle 130 may be attached on top of one or more legs 134. Two legs 134 are shown in FIG. 2 by example. The legs 134 may be housed within a wall 114 of the base enclosure 102 and extend out of the wall 114 when the handle 130 is pulled up. In some embodiments, the handle 130 may automatically switch between the up position or the down position. For example, a motor may be utilized to automatically extend and retract the legs 134. In some embodiments, the legs 134 may be spring biased such that the handle 130 pops up when a downward force towards the handle 130 is applied and released. In some embodiments, the legs 134 may be spring biased such that the handle 130 pops up when an upward force away from the handle 130 is applied. The legs 134 may be telescoping legs that elongate the legs 134.

When the handle 130 is in the up position as shown in FIG. 2, an opening 136 of the recess 116 may no longer be blocked by the handle 130. Hence, the plate 106 may have a clear path into and out of the recess 116 through the opening 136 when the handle 130 is in the up position. As a result, a handler may align and engage opposing sides 138 of the plate 106 with the tracks 126 and slide the plate 106 into the recess 116 such that the first surface 118 is facing away from the wall 114 to expose the first surface 118 and display the visuals 122 on the first surface 118 when desired. Then, the handler may push down the handle 130 into the down position to retain the plate 106 in the recess 116. The handle 130 may comprise a blocking edge 137 that mechanically interferes with movement of the plate 106 out of the recess 116 when the handle 130 is in the down position. The blocking edge 137 both mechanically blocks the plate 106 from being slidably removed from the recess 116 when the handle is in the down position and also does not mechanically block the plate 106 from being slidably removed from the recess 116 when the handle 130 is in the up position. After the handler has transported the shipper 100 based on the information provided by the visuals 122 on the first surface 118, the handler may lift the handle 130 to the up position, slide the plate 106 out of the recess 116, and slide the plate 106 into the recess 116 such that the second surface 120 is facing away from the wall 114 to expose the second surface 120 and display the visuals 122 on the second surface 120. The visuals 122 on the second surface 120 may include information pertaining to a subsequent leg of the shipment or how to return the shipper 100 back to its original location. The handler may push down the handle 130 into the down position to retain the plate 106 in the recess and transport the shipper 100 based on the information provided by the visuals 122 on the second surface 120.

Figure 3A:
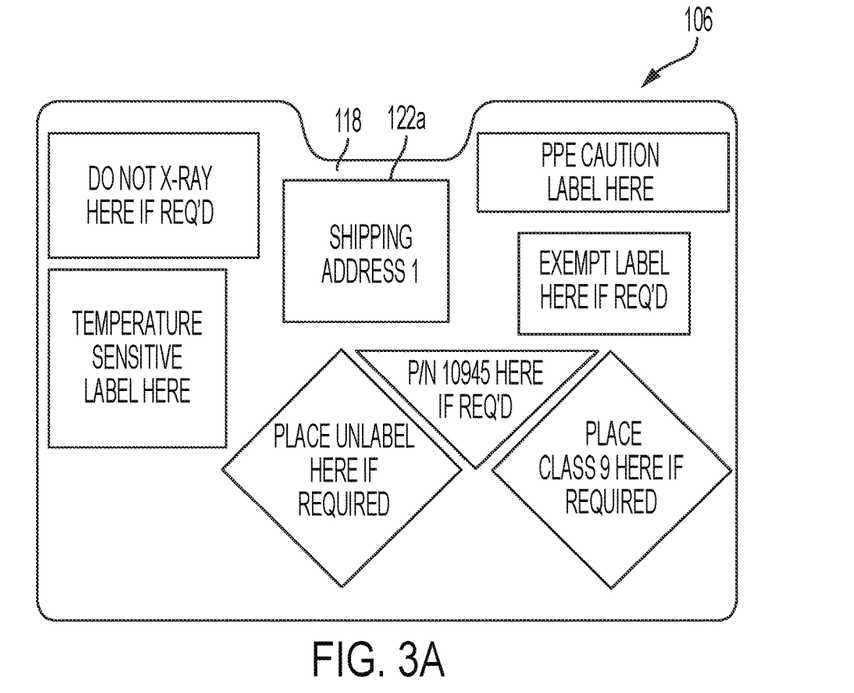
FIG. 3A shows a front view of a first surface of a plate of the hardened reusable shipping container of FIG. 1 according to an aspect of the present disclosure.
Figure 3B:
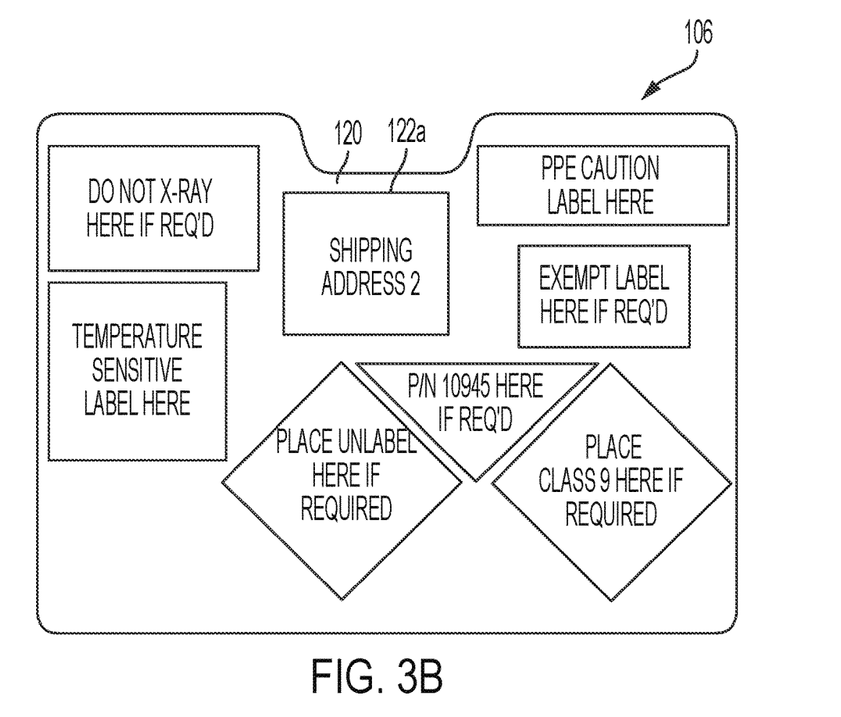
FIG. 3B shows a front view of a second surface of the plate of FIG. 3A according to an aspect of the present disclosure.

FIG. 3A shows a front view of the first surface 118 of the plate 106. FIG. 3B shows a front view of the second surface 120 of the plate 106. The first surface 118 includes a first set of visuals 122a and the second surface 120 includes a second set of visuals 122b. The first set of visuals 122a and the second set of visuals 122b include different information than one another. For example, the visuals 122a may include a first shipping address and the visuals 122b may include a second shipping address as shown in FIGS. 3A-3B. In another example, the visuals 122a may state that the shipper 100 (see FIGS. 1-2) contains a hazardous or temperature sensitive payload while the visuals 122b may state that the shipper 100 is empty.

Figure 4:
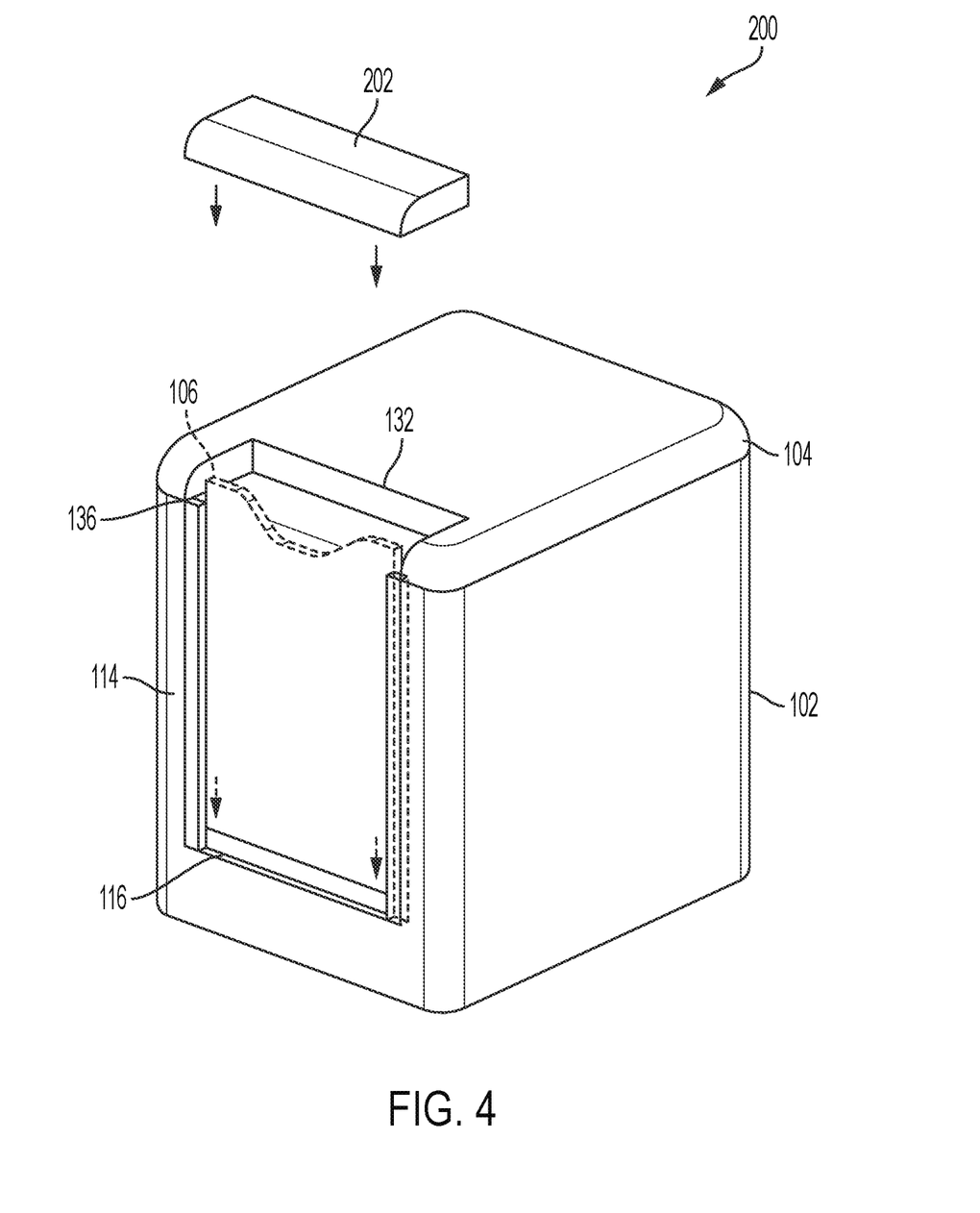
FIG. 4 shows a perspective view of a hardened reusable shipping container according to an aspect of the present disclosure.

FIG. 4 shows a perspective view of a hardened reusable shipping container 200 or a shipper 200. The shipper 200 may have the same specifications of the shipper 100 (see FIGS. 1-2) except having a cover 202 in lieu of the handle 130 (see FIGS. 1-2) to retain the plate 106 inside the recess 116. The cover 202 may be removably attached to the shipper 200 to cover the opening 136 of the recess 116. Once attached to the shipper 200, the cover 202 may at least partially sit over the plate 106 that is within the recess 116 to prevent the plate 106 from sliding out of the recess 116. As such, the plate 106 may be slidably removed from the recess 116 when the cover 202 is removed from the shipper 200 and may not be removed from the recess 116 when the cover 202 is attached to the shipper 200. The cover 202 may be received by a notch 132 of the lid 104 when the cover 202 is attached to the shipper 200. The cover 202 may be shaped and sized to fit snugly in the notch 132. The cover 202 may be flush with the lid 104 when attached to the shipper 200. Hence, the cover 202 may be integrated with the lid 104 and appear unified with the lid 104. In some embodiments, when the cover 202 is attached to the shipper 200, the cover 202 may be adjacent to the lid 104 as opposed to being within the notch 132 of the lid 104. In such embodiments, the cover 202 may extend along an entirety of a wall 114 of the base enclosure 102. The cover 202 may be fastened to the lid 104 and/or the base enclosure 102 via conventional fastening means such as snap fitment, screws, conventional fasteners, male-female connectors, adhesives, welds, or the like.

Figure 5:
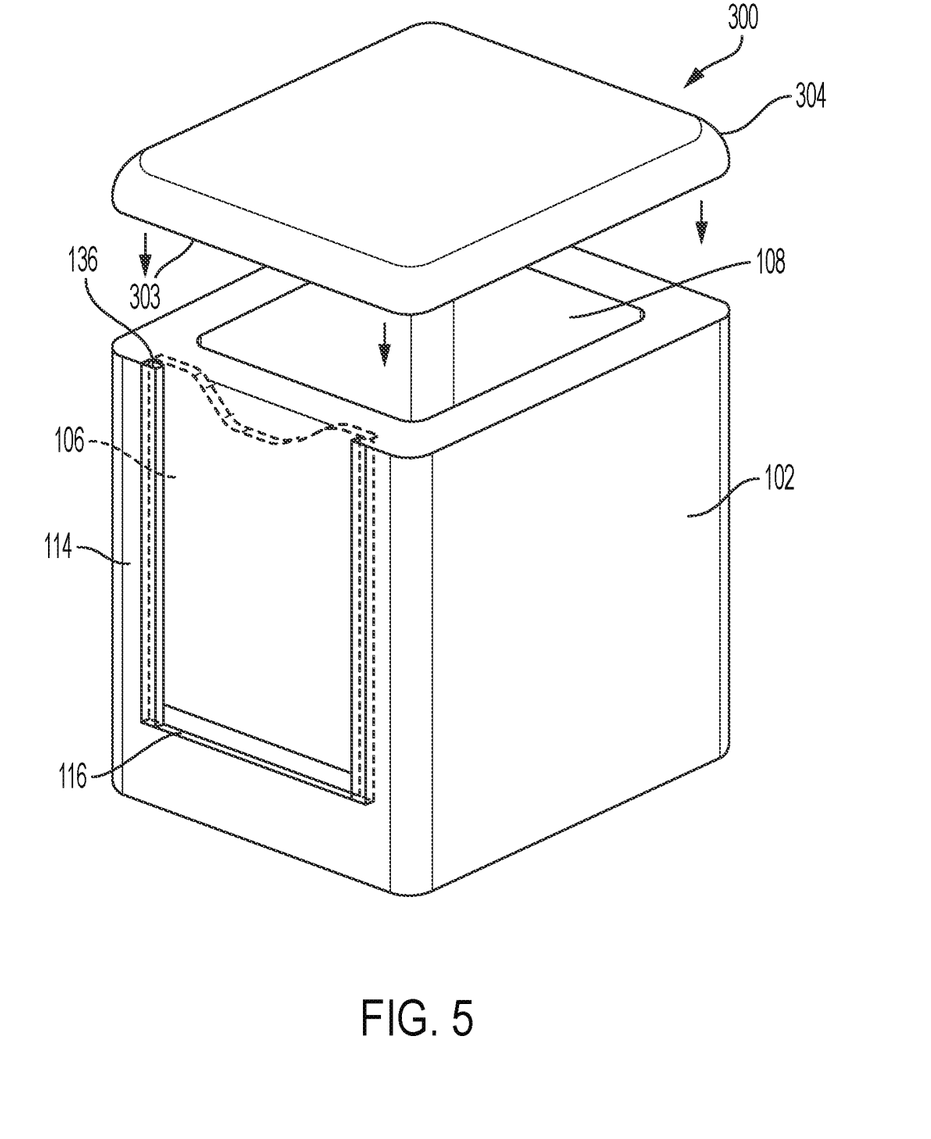
FIG. 5 shows a perspective view of a hardened reusable shipping container according to an aspect of the present disclosure.

FIG. 5 shows a perspective view of a hardened reusable shipping container 300 or a shipper 300. The shipper 300 may have the same specifications of the shipper 100 (see FIGS. 1-2) except having a lid 304 in lieu of the handle 130 (see FIGS. 1-2) to retain the plate 106 inside the recess 116. The lid 304 may be removably attached to the base enclosure 102 to cover the payload area 108 as well as the opening 136 of the recess 116. Once attached to the base enclosure 102, the lid 304 may at least partially sit over the plate 106 that is within the recess 116 so that a blocking edge of the lid 304 prevents the plate 106 from sliding out of the recess 116. As such, the plate 106 may be slidably removed from the recess 116 when the lid 304 is detached from the base enclosure 102 and may not be removed from the recess 116 when the lid 304 is attached to the base enclosure 102 in a fashion that covers the opening 136. The lid 304 may be attached to the base enclosure 102 via conventional fastening means such as snap fitment, screws, conventional fasteners, male-female connectors, adhesives, welds, or the like. In some embodiments, the lid 304 may be attached to the base enclosure 102 via hinges. In such embodiments, the recess 116 may be located on a wall 114 of the base enclosure 102 located on a side of the shipper 300 that does not coincide with the side the hinges are located on so that the recess 116 may be accessed through the opening 136 when the lid 304 is opened.

Figure 6:
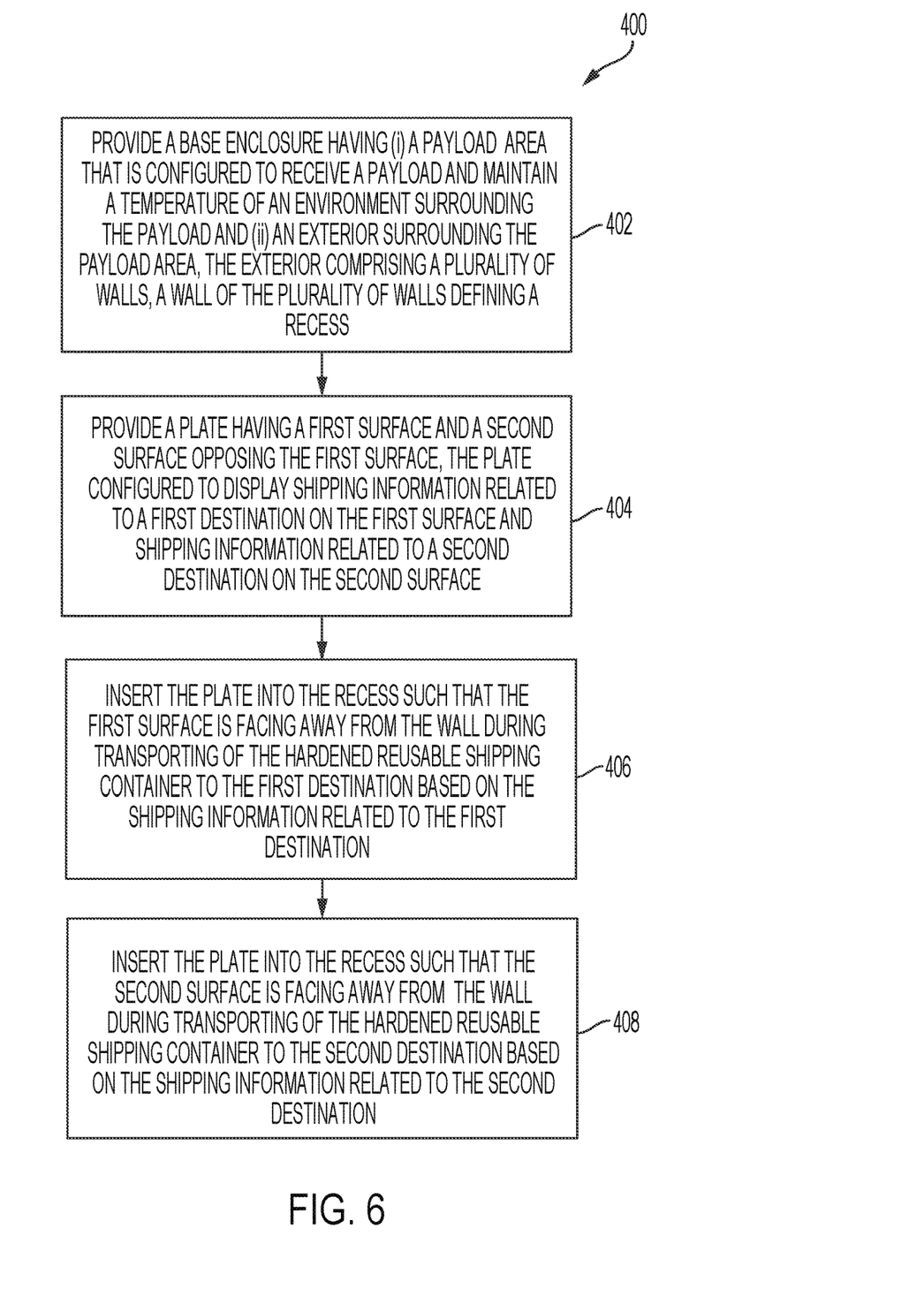
FIG. 6 shows a flow diagram of a method for using a hardened reusable shipping container according to an aspect of the present disclosure.

FIG. 6 shows a flow diagram of a method 400 for using the hardened reusable shipping container 100, 200, 300 or the shipper 100, 200, 300. The method 400 may begin with block 402.

In block 402, the method 400 may include providing a base enclosure 102 having a payload area 108 that is configured to receive a payload 110 and maintain a temperature of an environment surrounding the payload 110 and an exterior 112 surrounding the payload area 108. (see FIGS. 1-2, 4-5). The exterior 112 may include a plurality of walls 114 (see FIGS. 1-2, 4-5). A wall 114 of the plurality of walls 114 may define a recess 116 (see FIGS. 1-2, 4-5).

In block 404, the method 400 may include providing a plate 106 having a first surface 118 and a second surface 120 opposing the first surface (see FIGS. 3A-3B). The plate 106 may be configured to display shipping information related to a first destination on the first surface 118 and shipping information related to a second destination on the second surface 120. The shipping information related to the first destination and the shipping information related to the second destination may be relayed by the visuals 122 (see FIGS. 3A-3B).

In block 406, the method 400 may include inserting the plate 106 into the recess 116 such that the first surface 118 is facing away from the wall during transporting of the shipper 100, 200, 300 to the first destination based on the shipping information related to the first destination. Following the insertion, the plate 106 may be retained within the recess 116 via the handle 130 (see FIG. 1), the cover 202 (see FIG. 4), or the lid 304 (see FIG. 5). The shipping information may further include handling and care instructions. The handling and care instructions may be specific to the shipment to the first destination.

In block 408, the method 400 may include inserting the plate 106 into the recess 116 such that the second surface 120 is facing away from the wall 114 during transporting of the sipper 100, 200, 300 to the second destination based on the shipping information related to the second destination. Prior to the reinsertion, the plate 106 may be removed from the recess 116 in order to flip the plate 106 by bringing the handle 130 to an up position or removing the cover 202 or the lid 304. The shipping information may further include handling and care instructions. The handling and care instructions may be specific to the shipment to the second destination.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A hardened reusable shipping container, comprising:
a base enclosure having an exterior comprising a plurality of walls, the plurality of walls surrounding a payload area configured to receive a payload, the plurality of walls configured to maintain a temperature of an environment surrounding the payload within the payload area,
wherein a wall of the plurality of walls defines a recess; and
a plate removably insertable into the recess defined by the wall and comprising a first surface, a second surface opposing the first surface, and one or more visuals displayed on at least one of the first surface and the second surface; and
a handle received into a notch defined in a lid in a down position and selectably extendable from the notch to an up position,
wherein the handle comprises a blocking edge that mechanically blocks the plate from being slidably removed from the recess when the handle is in the down position and that does not mechanically block the plate from being slidably removed from the recess when the handle is in the up position.

2. The hardened reusable shipping container of claim 1, wherein the lid is configured to be coupled to the base enclosure and opened and closed.

3. The hardened reusable shipping container of claim 2, wherein the notch has a shape corresponding to a shape of the handle to receive the handle when the handle is in the down position.

4. The hardened reusable shipping container of claim 1, wherein the recess includes opposing tracks engaged with the plate and retaining the plate at least partially in the recess.

5. The hardened reusable shipping container of claim 4, wherein the wall further defines an opening into the recess, the opening configured to provide a path for the plate to be slidably inserted into the recess.

6. A hardened reusable shipping container, comprising:
a base enclosure having an exterior comprising a plurality of walls, the plurality of walls surrounding a payload area configured to receive a payload, the plurality of walls configured to maintain a temperature of an environment surrounding the payload within the payload area,
wherein a wall of the plurality of walls defines a recess;
a plate removably insertable into the recess defined by the wall and comprising a first surface, a second surface opposing the first surface, and one or more visuals displayed on at least one of the first surface and the second surface,
wherein the recess includes opposing tracks engaged with the plate and retaining the plate at least partially in the recess,
wherein the wall further defines an opening into the recess, the opening configured to provide a path for the plate to be slidably inserted into the recess; and
a cover fastened to the hardened reusable shipping container and covering the opening such that the plate is retained in the recess.

7. A hardened reusable shipping container, comprising:
a base enclosure comprising a plurality of walls surrounding a payload area to receive a payload and maintain a temperature of an environment surrounding the payload, a wall of the plurality of walls defining a recess;
a lid attached to the base enclosure and configured to be opened and closed; and
a plate having a first surface and a second surface opposing the first surface, the plate disposed in the recess and displaying information related to the payload or shipping on at least one of the first surface and the second surface,
wherein the lid comprises a blocking edge that mechanically blocks the plate from being removed from the recess when the lid is closed and that does not mechanically block the plate from being removed from the recess when the lid is opened so that the plate is retained in the recess when the lid is closed.

8. The hardened reusable shipping container of claim 7, further comprising a handle configured to be traversed between an up position and a down position and held to transport the hardened reusable shipping container in the up position.

9. The hardened reusable shipping container of claim 8, wherein the lid defines a notch having a shape corresponding to a shape of the handle, wherein the notch receives the handle when the handle is in the down position.

10. The hardened reusable shipping container of claim 7, wherein the recess includes opposing tracks that slidably engage with the plate and retain the plate at least partially in the recess.

11. The hardened reusable shipping container of claim 10, wherein the wall further defines an opening into the recess, the opening configured to provide a path for the plate to be slidably inserted into the recess.

12. A hardened reusable shipping container comprising:
a base enclosure comprising a plurality of walls surrounding a payload area to receive a payload and maintain a temperature of an environment surrounding the payload, a wall of the plurality of walls defining a recess;
a lid attached to the base enclosure and configured to be opened and closed;
a plate having a first surface and a second surface opposing the first surface, the plate disposed in the recess and displaying information related to the payload or shipping on at least one of the first surface and the second surface; and
a handle configured to be traversed between an up position and a down position and held to transport the hardened reusable shipping container in the up position,
wherein the plate is further configured to be slidably removed from the recess when the handle is in the up position and not removable when the handle is in the down position.

13. A hardened reusable shipping container, comprising:
a base enclosure comprising a plurality of walls surrounding a payload area to receive a payload and maintain a temperature of an environment surrounding the payload, a wall of the plurality of walls defining a recess;

a lid attached to the base enclosure and configured to be opened and closed; and a plate having a first surface and a second surface opposing the first surface, the plate disposed in the recess and displaying information related to the payload or shipping on at least one of the first surface and the second surface, wherein the recess includes opposing tracks that slidably engage with the plate and retain the plate at least partially in the recess, and wherein the wall further defines an opening into the recess, the opening configured to provide a path for the plate to be slidably inserted into the recess; and a cover fastened to the hardened reusable shipping container and covering the opening such that the plate is retained in the recess.

14. A method for using a hardened reusable shipping container, comprising:

providing a base enclosure having (i) a payload area to receive a payload and maintain a temperature of an environment surrounding the payload and (ii) an exterior surrounding the payload area, the exterior comprising a plurality of walls, a wall of the plurality of walls defining a recess;

providing a lid attached to the base enclosure and configured to be opened and closed;

providing a handle configured to be traversed between an up position and a down position and held to transport the hardened reusable shipping container in the up position;

providing a plate having a first surface and a second surface opposing the first surface, the plate configured to display shipping information related to a first destination on the first surface and shipping information related to a second destination on the second surface;

inserting the plate into the recess such that the first surface is facing away from the wall during transporting of the hardened reusable shipping container to the first destination based on the shipping information related to the first destination; and inserting the plate into the recess such that the second surface is facing away from the wall during transporting of the hardened reusable shipping container to the second destination based on the shipping information related to the second destination, wherein the plate is configured to be slidably removed from the recess when the handle is in the up position and not removable when the handle is in the down position.

15. The method of claim 14, further comprising traversing a handle of the reusable shipping container to an up position from a down position to slide the plate into or out of the recess and traversing the handle to the down position from the up position to retain the plate in the recess.

16. The method of claim 14, further comprising aligning and engaging opposing sides of the plate with opposing tracks disposed within the recess and sliding the plate through the tracks to allow the tracks to retain the plate.

* * * * *